United States Patent
Grundvig et al.

(10) Patent No.: US 6,600,793 B1
(45) Date of Patent: Jul. 29, 2003

(54) MINIMAL OVERHEAD EARLY LATE TIMING RECOVERY

(75) Inventors: Jeffrey Paul Grundvig, Macungie, PA (US); Yun Xiang Yuan, Emmaus, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/163,429

(22) Filed: Sep. 30, 1998

(51) Int. Cl.[7] .................................................. H04L 7/00
(52) U.S. Cl. ...................................... 375/326; 375/354
(58) Field of Search .............................. 375/326, 327, 375/354, 371, 373, 375, 376

(56) References Cited

U.S. PATENT DOCUMENTS

| | | | |
|---|---|---|---|
| 4,538,280 A | * 8/1985 | Mosley, Jr. et al. | 375/149 |
| 5,272,730 A | * 12/1993 | Clark | 375/376 |
| 5,463,351 A | * 10/1995 | Marko et al. | 331/1 A |
| 5,553,100 A | * 9/1996 | Saban et al. | 375/340 |
| 5,559,841 A | * 9/1996 | Pandula | 375/375 |
| 5,870,441 A | * 2/1999 | Cotton et al. | 375/354 |

* cited by examiner

Primary Examiner—Young T. Tse
(74) Attorney, Agent, or Firm—Harness, Dickey & Pierce, P.L.C.

(57) ABSTRACT

A timing recovery circuit and method which determines whether a sample point in a generated bit sequence is early or late based on binary logic which is already available used in generating a bit sequence by comparing energy magnitudes of adjacent bits. The waveform of an input symbol is correlated against reference waveforms. When the incoming waveform does not perfectly match a reference waveform, symbol energy less than maximum is output indicating that the timing of the sampling points is either early or late. Symbol energy magnitudes between adjacent bits are then compared. Using the bit pattern of the generated bit sequence and the results of comparisons of energy magnitudes of adjacent bits, it is determined whether the timing of the sampling points is early or whether it is late.

13 Claims, 3 Drawing Sheets

MINIMAL OVERHEAD EARLY LATE TIMING RECOVERY

BACKGROUND OF THE INVENTION

1. Field of the Invention

The present invention relates to a timing recovery circuit and more specifically to a timing recovery circuit for determining whether a sample point in a generated bit sequence is early or late based on binary logic already available in forming the generated bit sequence by comparing energy magnitudes of adjacent bits.

2. Description of Related Art

Timing recovery circuits are commonly used in communication channels to determine whether a sample point in a generated bit sequence is early or late. However, these conventional timing circuits require additional information and circuitry beyond what is needed to generate the bit sequence in order to determine whether the sample point is early or late. For a digital implementation, the required circuitry can be significant resulting in excessive complexity and cost. For example, conventional off-symbol boundary or fractional-symbol integrate and dump circuits require extra circuitry to perform integration and extra magnitude information must be obtained in order to determine whether a sample point is early or late.

SUMMARY OF THE INVENTION

The timing recovery circuit and method of the present invention determine whether a sample point in a generated bit sequence is early or late based on binary logic which is already available from the generated bit sequence by comparing energy magnitudes of adjacent bits. Symbol decisions are made with respect to sample points and a bit sequence is generated, using waveforms of an input signal correlated against a reference waveform for a one "1" symbol and a reference waveform for a zero "0" symbol. When the incoming waveform perfectly matches either reference waveform, maximum symbol energy is output indicating that the timing of the sampling points is correct. By contrast, when the incoming waveform does not perfectly match either reference waveform, symbol energy less than maximum is output indicating that the timing of the sampling points is early or late.

Next, the outputted symbol energy magnitudes between adjacent bits are compared. Using the bit pattern of the generated bit sequence and the results of the comparison of the energy magnitudes of adjacent bits, it can be determined whether the timing of a sampling point is early or late. Thus, determination of whether the timing of a sample point in a generated bit sequence is early or late does not require extra integration, circuitry, or magnitude information beyond that required for executing symbol decisions on the sample points.

DETAILED DESCRIPTION OF THE INVENTION

A detailed description of the structure and operation of the present invention will be given below with reference to the figures.

Figure 1:
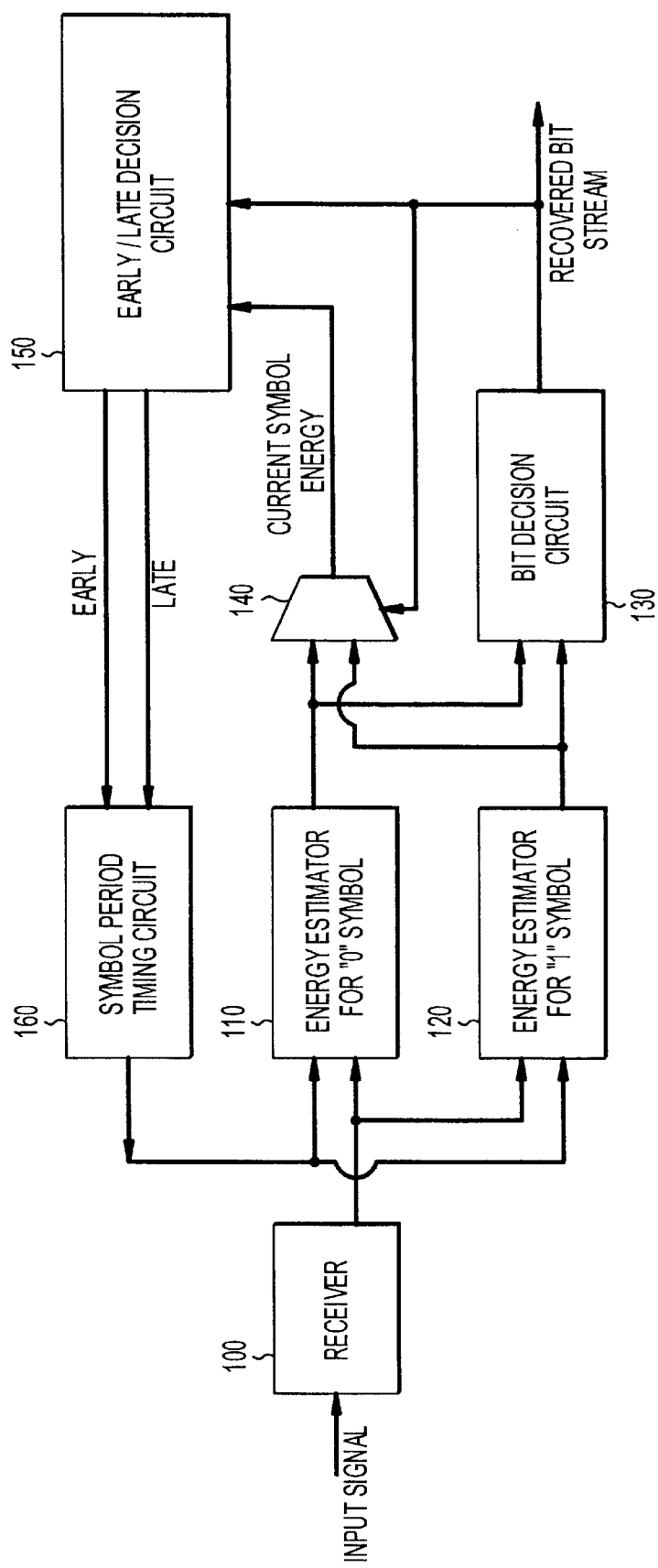
FIG. 1 is a block schematic of an embodiment of the present invention.
Figure 2:
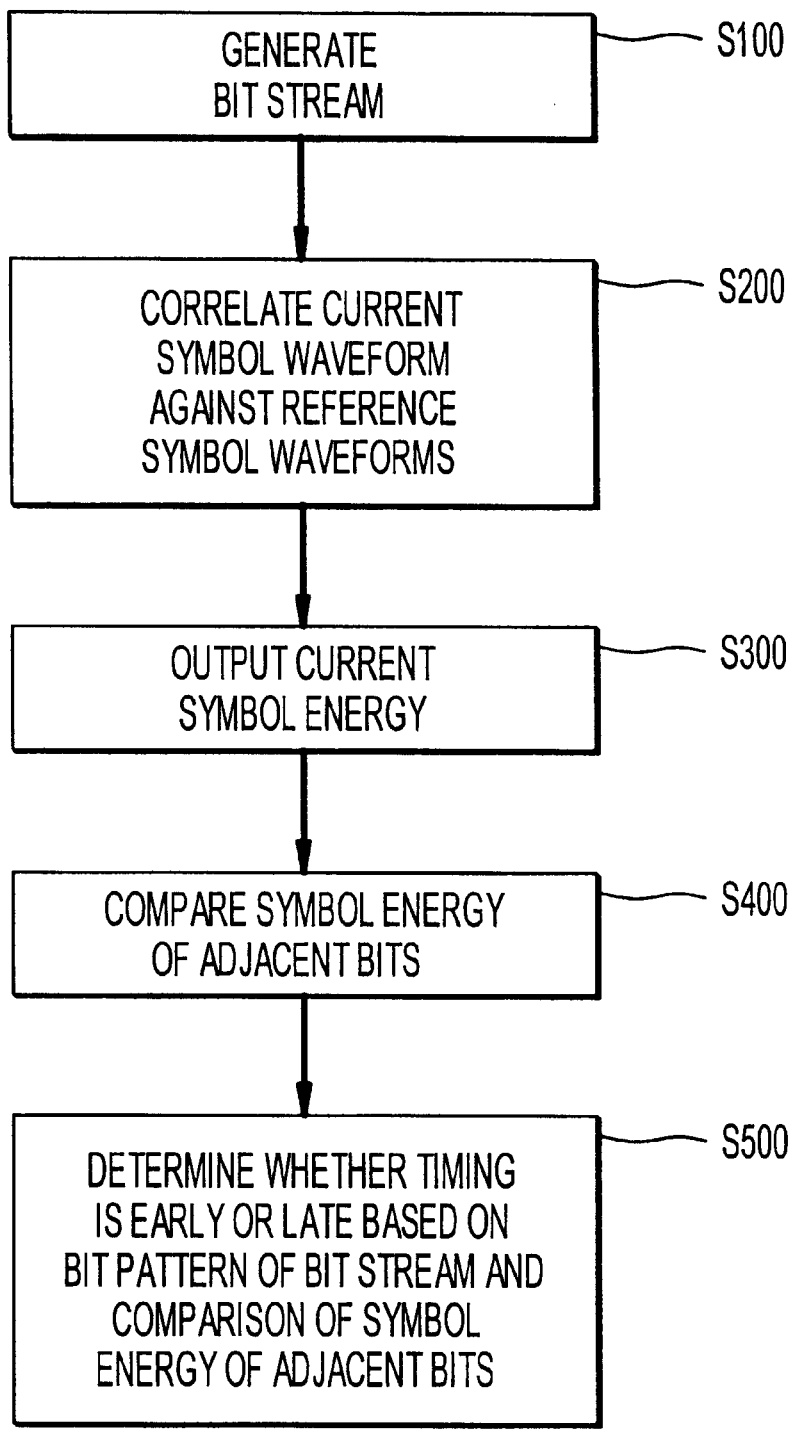
FIG. 2 is a flow chart for determining whether timing of a sample point is early or late according to the present invention.

FIG. 1 illustrates a block schematic of an embodiment of the present invention and FIG. 2 represents operation of an embodiment of the present invention. As shown in FIG. 1, the timing recovery circuit 1 of the present invention includes a receiver 100, an energy estimator 110 for a zero "0" symbol, an energy estimator 120 for a one "1" symbol, a bit decision circuit 130, a comparator 140, an early/late decision circuit 150, and a symbol period timing circuit 160.

Initially, the receiver 100 receives an input signal transmitted through a communication channel. A binary FSK (frequency-shift keying) non-coherent receiver is one example of the receiver 100. The receiver 100 then transmits the waveform of the input signal to the energy estimator 110 for a zero "0" symbol and the energy estimator 120 for a one "1" symbol in response to the input signal.

An integrate and dump circuit is one example of the energy estimators 110 and 120. The energy estimator 110 outputs the magnitude of how closely the received signal matches the reference waveform for a zero "0" symbol to the bit decision circuit 130 and the comparator 140. Similarly, the energy estimator 120 outputs the magnitude of how closely the received signal matches the reference signal waveform for a one "1" symbol to the bit decision circuit 130 and the comparator 140.

The bit decision circuit 130 compares the relative magnitudes of the energy estimators and makes the bit decision based on which is larger. For a binary FSK non-coherent receiver, the bit decision (symbol decision) process is based on whether the signal energy magnitude for one tone is greater or less than the signal energy for another tone.

The bit decision circuit 130 performs the bit decision process and outputs binary decision information as a bit sequence of 1's and 0's. By making consecutive bit decisions, a recovered bit stream (bit sequence) is generated (S100 in FIG. 2). The recovered bit stream is output from the bit decision circuit 130 to the comparator 140 and the early/late decision circuit 150.

The comparator 140 provides the current symbol energy to the early/late decision circuit 150. When the current symbol waveform perfectly matches either reference waveform (S200 in FIG. 2), the comparator 140 outputs maximum symbol energy as the current symbol energy (S300 in FIG. 2). By contrast, when the incoming waveform does not perfectly match either of the reference waveforms (S200 in FIG. 2), the comparator outputs symbol energy less than maximum as the current symbol energy (S300 in FIG. 2).

The current symbol energy is output to the early/late decision circuit 150. Maximum symbol energy indicates that the timing of the sampling points is correct, while symbol energy less than maximum indicates that the timing of the sampling points is early or late. The early/late decision circuit 150 then compares symbol energy magnitudes of the current bit and two or more adjacent bits (S400 in FIG. 2). The bit pattern of the generated bit sequence and the results of the comparison of the energy magnitudes of adjacent bits in the form of binary information is used to determine whether the timing of sampling point is early or late (S500 in FIG. 2).

Consider the following bit sequence shown in Table 1.

TABLE 1

| time   | $t_0$ | $t_1$ | $t_2$ | $t_3$ | $t_4$ |
|--------|-------|-------|-------|-------|-------|
| symbol | 0     | 0     | 1     | 1     | 0     |

By comparing the energy magnitudes of the two adjacent "1" symbols in the middle of the sequence, it can be determined whether the sample point timing is early or late. Namely, if the integrate and dump sample point starts at precisely the correct time, then the symbol energy for the "1" symbol at time $t_2$ should equal the symbol energy for the "1" symbol at time $t_3$. On the other hand, if the integrate and dump point starts either early or late, then the symbol energy for the "1" symbol at time $t_2$ will not equal the symbol energy for the "1" symbol at time $t_3$.

Figure 3:
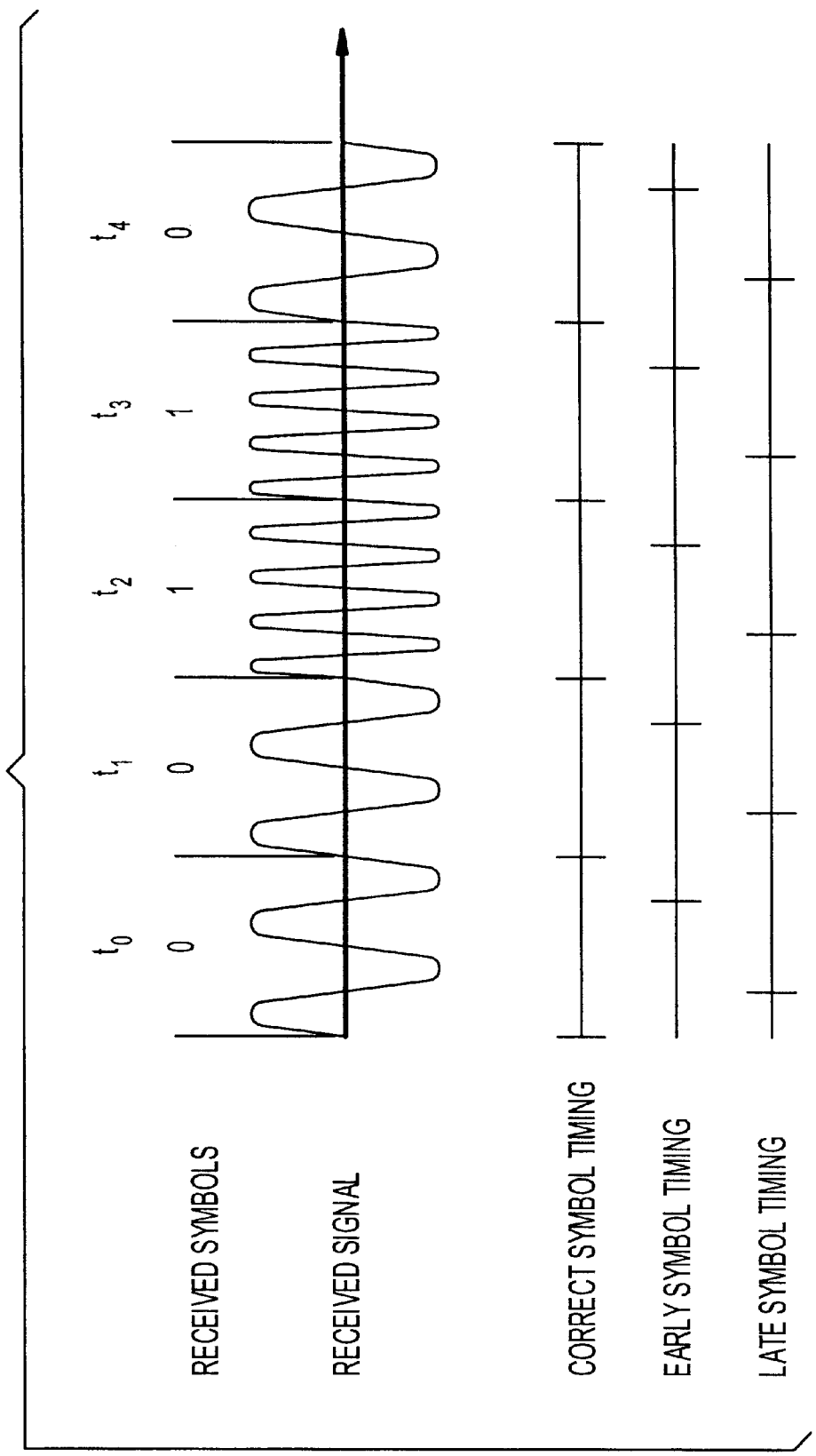
FIG. 3 illustrates one example of a generated bit sequence and shows correct symbol timing, early symbol timing, and late symbol timing.

For example, if the symbol energy of the "1" symbol at time $t_2$ is greater than the symbol energy of the "1" symbol at time $t_3$, then it is implied that the sample point is too far to the right, i.e., that the timing is late. As shown in FIG. 3, when timing is late, the integration period of t2 includes part of the waveform of the "1" symbol at time $t_3$ and the integration period of $t_3$ includes part of the waveform of the "0" symbol at time $t_4$. When the waveform of the symbol at $t_2$ is correlated against the reference waveforms for a zero "0" symbol and a one "1" symbol, there would still be a match with the one "1" symbol and maximum symbol energy would be output from the comparator 140. However, when the waveform of the symbol at $t_3$ is correlated against the reference waveforms for a zero "0" symbol and a one "1" symbol, there would not be a perfect match and less than maximum symbol energy would be output from the comparator 140. Therefore, the symbol energy for integration period $t_2$ would be greater than the symbol energy for the integration period $t_3$ when timing is late.

Likewise, if the symbol energy of the "1" symbol at time $t_3$ is greater than the symbol energy of the "1" symbol at time $t_2$, then it is implied that the sample point is too far to the left, i.e., that the timing is early. As shown in FIG. 3, when timing is early, the integration period of $t_2$ includes part of the waveform of the "0" symbol at time $t_1$ and the integration period of $t_3$ includes part of the waveform of the "1" symbol at time $t_2$. When the waveform of the symbol at $t_3$ is correlated against the reference waveforms for a zero "0" symbol and a one "1" symbol, there would still be a match with the one "1" symbol and maximum symbol energy would be output from the comparator 140. However, when the waveform of the symbol at $t_2$ is correlated against the reference waveforms for a zero "0" symbol and a one "1" symbol, there would not be a perfect match and less than maximum symbol energy would be output from the comparator 140. Therefore, the symbol energy for integration period $t_3$ is greater than the symbol energy for the integration period $t_2$ when timing is early.

By comparing the symbol energies of only three adjacent bits, it can be determined whether the timing of a sampling point is early or late, although any number of bits can be used. Given three consecutive bits (Bit0, Bit1, Bit2), determining whether the symbol energy for Bit1 is greater than the symbol energy for Bit0 (Is Bit1>Bit0?) and determining whether the symbol energy for Bit2 is greater than the symbol energy for Bit1 (Is Bit2>Bit1?) will indicate whether the timing is early or late.

With this binary information, a table such as Table 2 can be constructed to generate early late control information. For Table 2, TRUE=1, FALSE=0 and IRRELEVANT=X. Because Table 2 represents a comparison of symbol energies, it is not necessarily true that Bit1>Bit0?=1 when the incoming symbol waveform for Bit1 is a one "1" symbol and the incoming symbol waveform for Bit0 is a zero "0" symbol. The symbol energy for each bit depends on whether there is a perfect match between the incoming symbol waveform and one of the reference waveforms. That is, the symbol energy does not depend on whether the incoming symbol is a one "1" symbol or a zero "0" symbol.

TABLE 2

| Bit0 | Bit1 | Bit2 | Is Bit1 > Bit0? | Is Bit2 > Bit1? | Output Control |
|------|------|------|-----------------|-----------------|----------------|
| 0 | 0 | 0 | X | X | none |
| 1 | 1 | 1 | X | X | none |
| 0 | 1 | 0 | X | X | none |
| 1 | 0 | 1 | X | X | none |
| 0 | 1 | 1 | 0 | 1 | early |
| 0 | 1 | 1 | 1 | X | late |
| 0 | 1 | 1 | 0 | 0 | none |
| 1 | 0 | 0 | 0 | 1 | early |
| 1 | 0 | 0 | 1 | X | late |
| 1 | 0 | 0 | 0 | 0 | none |
| 1 | 1 | 0 | 0 | 1 | late |
| 1 | 1 | 0 | X | 0 | early |
| 1 | 1 | 0 | 1 | 1 | none |
| 0 | 0 | 1 | 0 | 1 | late |
| 0 | 0 | 1 | X | 0 | early |
| 0 | 0 | 1 | 1 | 1 | none |

The early late decision circuit 150 outputs early or late control signals to the symbol period timing circuit 160 in response to the binary decision information (output bits). Upon receipt of early or late control signals, the symbol period timing circuit 160 makes the appropriate adjustment to correct the timing of the sample points.

As described above, the timing recovery circuit of the present invention determines whether a sample point in a generated bit sequence is early or late based on binary logic which is already available in forming the generated bit sequence by comparing energy magnitudes of adjacent bits and does not require excess circuitry.

What is claimed is:

1. A timing recovery circuit comprising:
   a bit decision circuit for generating a bit stream;
   an early/late decision circuit for determining whether timing of said generated bit stream is early or late based on a comparison of symbol energy magnitudes of adjacent bits of said bit stream; and
   a comparator for correlating an incoming symbol waveform against reference symbol waveforms and outputting said symbol energy magnitudes based on correlation between said incoming symbol waveform and said reference symbol waveforms.

2. The timing recover circuit according to claim 1, wherein said reference symbol waveforms include a reference symbol waveform for a zero "0" symbol and a reference symbol waveform for a one "1" symbol.

3. The timing recover circuit according to claim 2, further including a first energy estimator outputting said reference symbol waveform for said zero "0" symbol and a second energy estimator for outputting said reference symbol waveform for said one "1" symbol.

4. The timing recovery circuit according to claim 1, wherein said comparator outputs a first symbol energy when said incoming symbol waveform matches one of said reference symbol waveforms and outputs a second symbol energy when said incoming symbol waveform does not match any of said reference symbol waveforms.

5. The timing recovery circuit according to claim 1, wherein said early/late decision circuit compares three adjacent bits.

6. A timing recovery circuit comprising:
   means for generating a bit stream;
   means for determining whether timing of said generated bit stream is early or late based on a comparison of symbol energy magnitudes of adjacent bits of said bit stream; and means for correlating an incoming symbol waveform against reference symbol waveforms and outputting said symbol energy magnitudes based on correlation between said incoming symbol waveform and said reference symbol waveforms.

7. The timing recovery circuit according to claim 6, wherein said reference symbol waveforms include a reference symbol waveform for a zero "0" symbol and a reference symbol waveform for a one "1" symbol.

8. The timing recovery circuit according to claim 6, wherein a first symbol energy is output when said incoming symbol waveform matches one of said reference symbol waveforms and a second symbol energy is output when said incoming symbol waveform does not match any of said reference symbol waveforms.

9. A timing recovery circuit comprising:

means for generating a bit stream; and means for determining whether timing of said generated bit stream is early or late based on a comparison of symbol energy magnitudes of adjacent bits of said bit stream;

wherein said means for determining compares three adjacent bits.

10. A method of timing recovery, comprising the steps of:

generating a bit stream; and determining whether timing of said generated bit stream is early or late based on a comparison of symbol energy magnitudes of adjacent bits of said bit stream;

wherein said symbol energy magnitudes are based on correlation of an incoming symbol waveform against reference symbol waveforms.

11. The method according to claim 10, wherein said reference symbol waveforms include a reference symbol waveform for a zero "0" symbol and a reference symbol waveform for a one "1" symbol.

12. The method according to claim 10, wherein a first symbol energy is output when said incoming symbol waveform matches one of said reference symbol waveforms and a second symbol energy is output when said incoming symbol waveform does not match any of said reference symbol waveforms.

13. A method of timing recovery, comprising the steps of:

generating a bit stream; and determining whether timing of said generated bit stream is early or late based on a comparison of symbol energy magnitudes of adjacent bits of said bit stream;

wherein said determining step includes comparing three adjacent bits.

\* \* \* \* \*